United States Patent
Patra et al.

(10) Patent No.: US 10,902,203 B2
(45) Date of Patent: Jan. 26, 2021

(54) NAMED ENTITY DISAMBIGUATION USING ENTITY DISTANCE IN A KNOWLEDGE GRAPH

(71) Applicant: Oracle International Corporation, Redwood Shores, CA (US)

(72) Inventors: Rhicheek Patra, Zurich (CH); Davide Bartolini, Obersiggenthal (CH); Sungpack Hong, Palo Alto, CA (US); Hassan Chafi, San Mateo, CA (US); Alberto Parravicini, Lesmo (IT)

(73) Assignee: Oracle International Corporation, Redwood Shores, CA (US)

( * ) Notice: Subject to any disclaimer, the term of this patent is extended or adjusted under 35 U.S.C. 154(b) by 86 days.

(21) Appl. No.: 16/392,386

(22) Filed: Apr. 23, 2019

(65) Prior Publication Data

US 2020/0342055 A1    Oct. 29, 2020

(51) Int. Cl.
*G06F 40/295* (2020.01)
*G06N 5/02* (2006.01)

(52) U.S. Cl.
CPC ........... *G06F 40/295* (2020.01); *G06N 5/022* (2013.01)

(58) Field of Classification Search
USPC .................................................... 704/1–504
See application file for complete search history.

(56) References Cited

U.S. PATENT DOCUMENTS

| | | | | |
|---|---|---|---|---|
| 10,108,700 B2* | 10/2018 | Gupta | ................... | G06N 5/025 |
| 10,146,775 B2* | 12/2018 | Langmead | ............ | G06F 40/134 |
| 10,152,478 B2* | 12/2018 | Langmead | ............ | G06F 40/134 |
| 10,210,245 B2* | 2/2019 | Zou | ....................... | G06F 16/322 |
| 2014/0280307 A1* | 9/2014 | Gupta | ................... | G06N 5/025 |
| | | | | 707/769 |
| 2016/0328467 A1* | 11/2016 | Zou | ......................... | G06F 16/36 |
| 2016/0357738 A1* | 12/2016 | Langmead | ............ | G06F 40/134 |
| 2016/0357857 A1* | 12/2016 | Langmead | .......... | G06F 16/3344 |

* cited by examiner

*Primary Examiner* — Marcus T Riley
(74) *Attorney, Agent, or Firm* — Hickman Palermo Becker Bingham LLP

(57) ABSTRACT

Techniques are described herein for performing named entity disambiguation. According to an embodiment, a method includes receiving input text, extracting a first mention and a second mention from the input text, and selecting, from a knowledge graph, a plurality of first candidate vertices for the first mention and a plurality of second candidate vertices for the second mention. The present method also includes evaluating a score function that analyzes vertex embedding similarity between the plurality of first candidate vertices and the plurality of second candidate vertices. In response to evaluating and seeking to optimize the score function, the method performs selecting a first selected candidate vertex from the plurality of first candidate vertices and a second selected candidate vertex from the plurality of second candidate vertices. Further, the present method includes mapping a first entry from the knowledge graph to the first mention and mapping a second entry from the knowledge graph to the second mention. In this embodiment, the first entry corresponds to the first selected candidate vertex and the second entry corresponds to the second selected candidate.

20 Claims, 8 Drawing Sheets

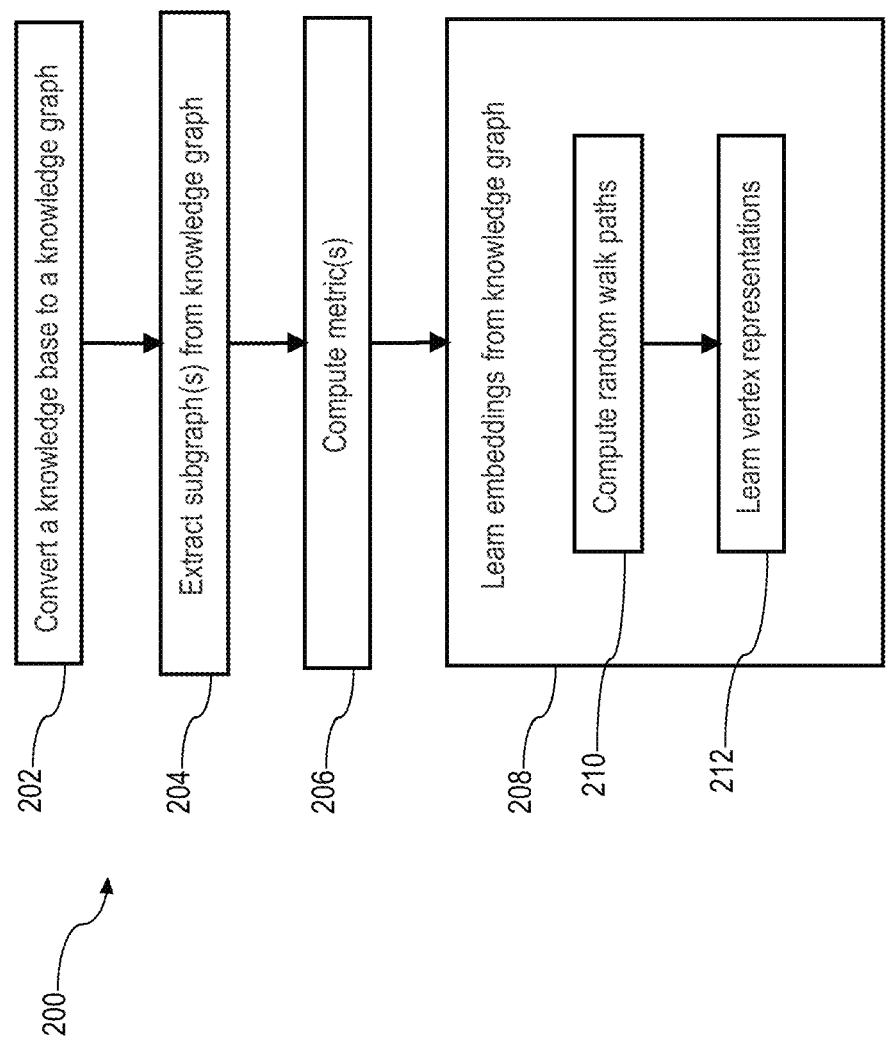

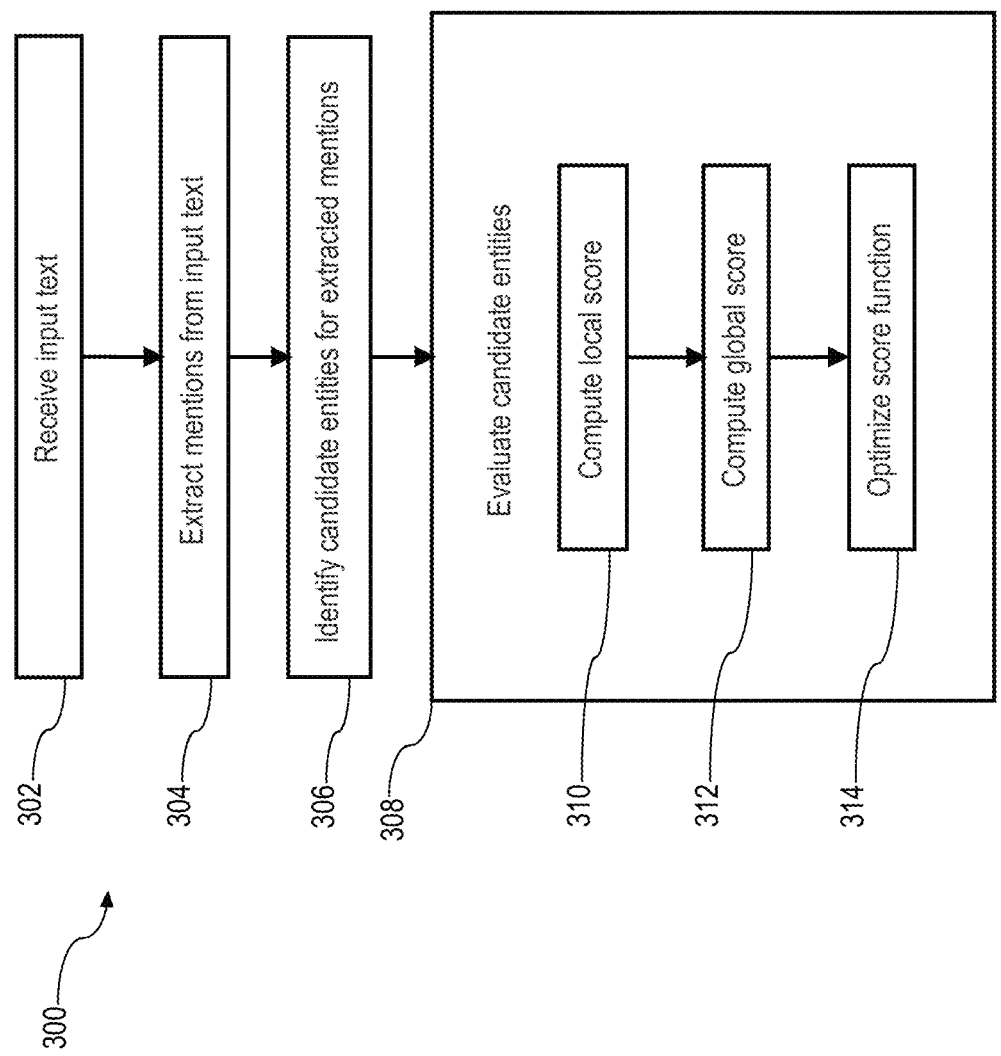

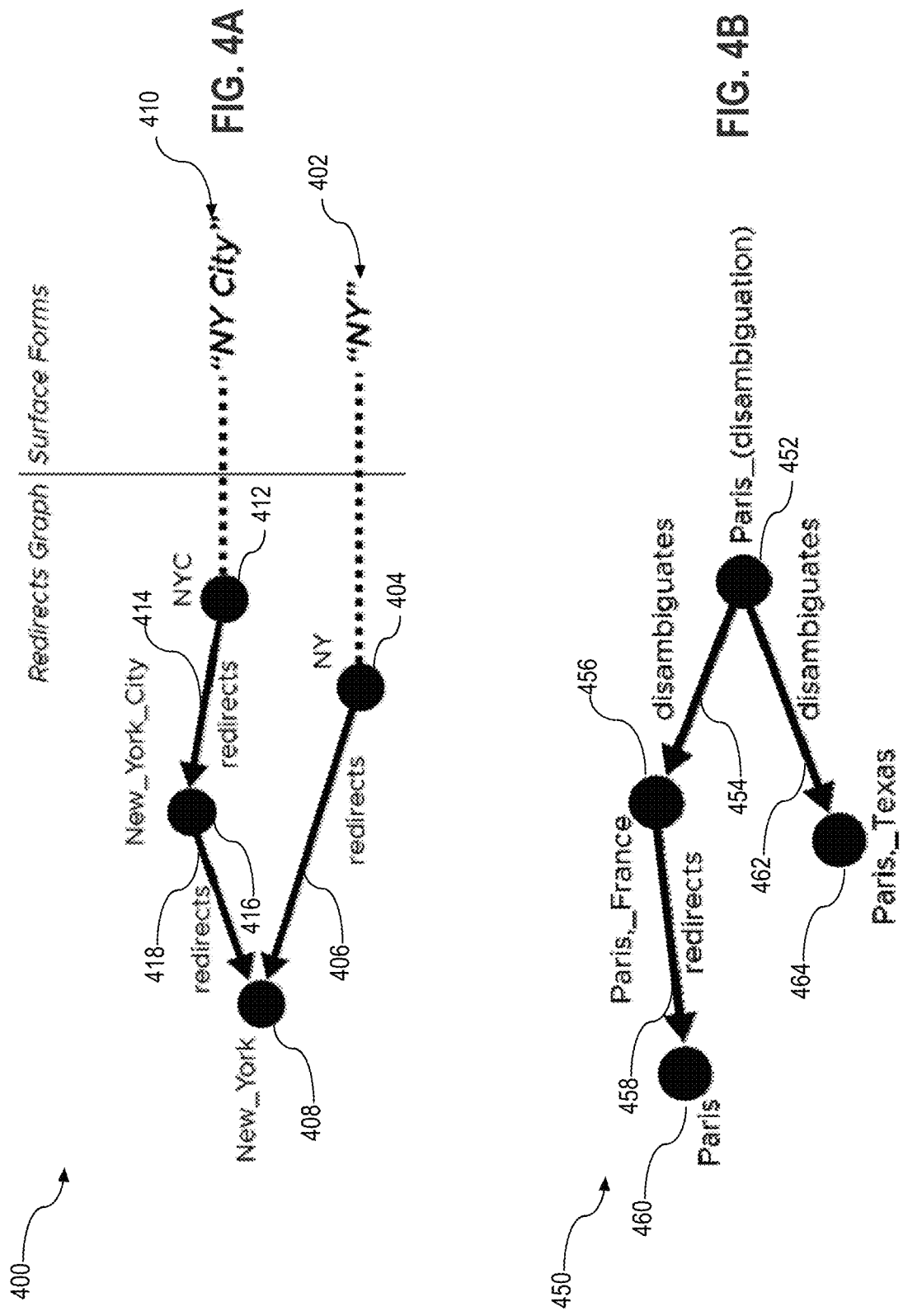

NAMED ENTITY DISAMBIGUATION USING ENTITY DISTANCE IN A KNOWLEDGE GRAPH

FIELD OF THE DISCLOSURE

The present disclosure relates to named entity disambiguation using entity distance in a knowledge graph.

BACKGROUND

Entity linking, which is also sometimes called named entity disambiguation (NED), involves the task of mapping words of interest from an input text to corresponding unique entities in a target knowledge base. Illustratively, the words of interest may be named entities, such as names of persons, locations, companies, and the like, the target knowledge base may be Wikipedia, and a unique entry in the knowledge base may be a particular Wikipedia page. Entity linking is an important technology that has many applications and business use cases. For instance, entity linking technology is useful for building natural language processing (NLP) applications to implement text analysis, voice recognition, semantic search, chatbots, and the like, and in use cases, such as recognizing risk entities in customer data, processing medical history data, analyzing social network content analysis, recommending products/services, as well as other areas that may benefit from high-level representations of input text, in which concepts relevant to a given application are separated from noisy text.

Although entity linking conceptually appears to be a fairly simple task, there are many challenges that arise. One challenge is the issue of ambiguity, which relates to words of interest that are to be linked (sometimes referred to as mentions or surface forms) being ambiguous and that might refer to multiple entities in a knowledge base if considered independently. For example, "zeppelin" might refer to a type of airship, or to the famous band "Led Zeppelin." Another challenge is the issue of scalability and speed, which relates to the ability of an entity linking system to provide results on-demand in a reasonable time, and often in real-time. This ability can be challenging to accomplish when using a large knowledge base and/or when processing large documents with many mentions. Wikipedia, for instance, contains nearly 9 million entities and around 165 million relationships among these entities. A further challenge arises in the context of limited information. Generally, there is a desire for a robust entity linking system that is able to function well with a limited amount of information and context, for example, to process short documents that contain only a relatively low number of mentions. An entity linking system should also be able to deal with evolving information, and to integrate updates in the knowledge base.

BRIEF DESCRIPTION OF THE DRAWINGS

FIG. 2 is a flowchart depicting a graph learning phase of an entity linking technique according to an embodiment.

FIG. 3 is a flowchart depicting an execution phase of an entity linking technique according to an embodiment.

FIG. 4A illustrates a redirects graph according to an example.

FIG. 4B illustrates a redirects graph including disambiguation links according to another example.

DETAILED DESCRIPTION

Figure 1:
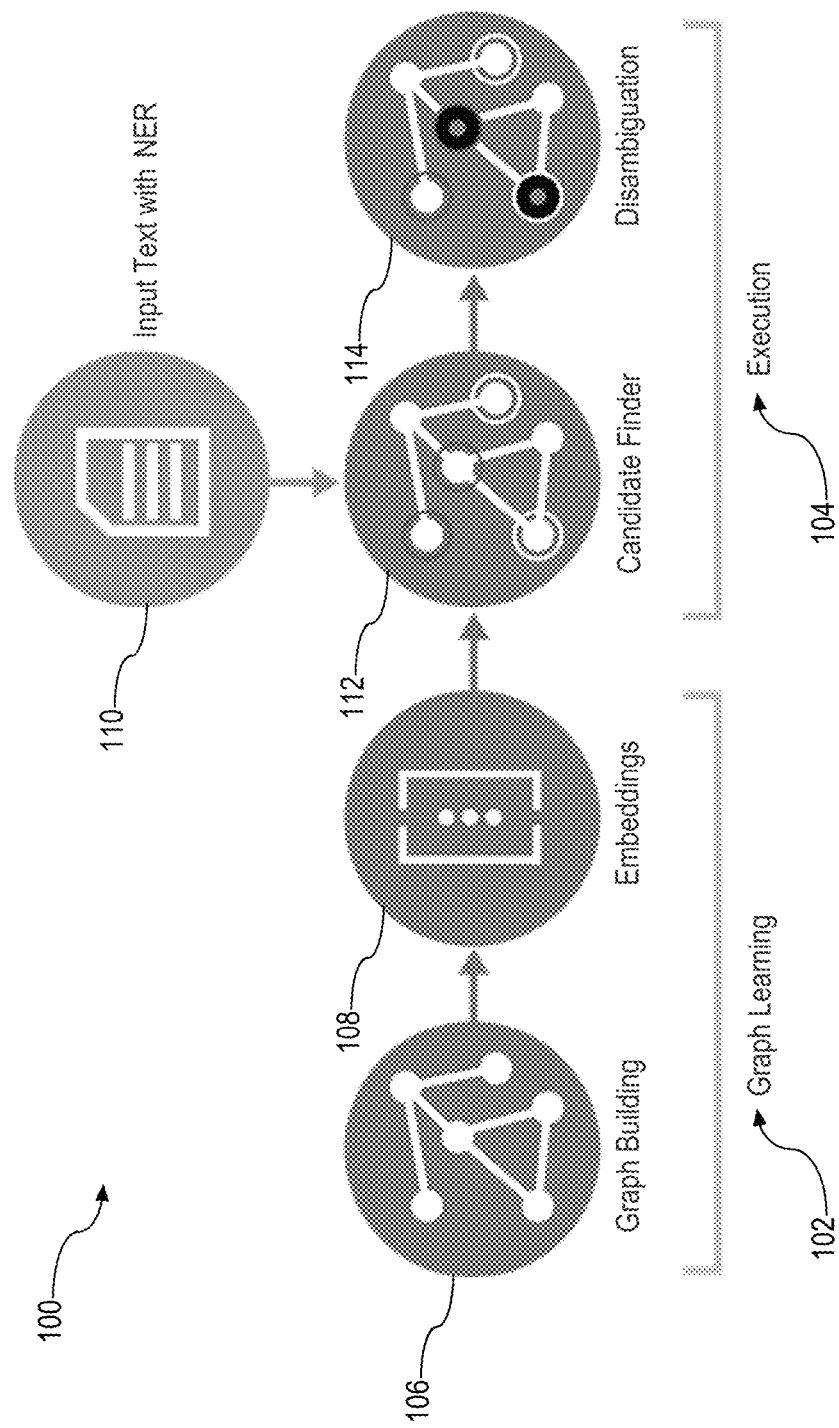
FIG. 1 is a diagrammatic representation of an entity linking system according to an embodiment.

In the following description, for the purpose of explanation, numerous specific details are set forth in order to provide a thorough understanding of the present disclosure. It will be apparent, however, that the present disclosure may be practiced without these specific details.

General Overview

Entity linking or named entity disambiguation (NED) techniques are discussed herein in relation to various embodiments that provide technical advantages and help to address challenges, such as one or more of the challenges discussed in the Background section.

The disclosed NED techniques help to reduce training overhead by being relatively content-agnostic and not requiring large text corpus for effective training. The NED techniques also provide flexibility by facilitating extension of NED applications for different domains (e.g., different knowledge bases) or even cross-domains without re-training over yet another text corpus, but rather by replacing or extending the underlying knowledge graph. Using vertex embedding and/or optimization processes, the NED techniques disclosed herein facilitate fast execution to perform NED in real time even for very large data sets, such as for Wikipedia or DBpedia with its nearly 9 million entities and around 165 million relationships or connections between the entities. Further, the disclosed NED techniques help to provide better quality of answer, performance, and accuracy even without large text mining.

Embodiments of the present disclosure utilize entity distance in a knowledge graph to provide improved NED techniques. According to an embodiment, the NED techniques use distance metrics based on Personalized PageRank techniques and/or vertex embeddings, to measure or quantify distance between entities in the knowledge graph. The NED techniques then use the measured distance to evaluate a score function for a candidate selection process, which provides accurate entity linking or mapping between mentions from input text to entities in the knowledge base by seeking to optimize the score function.

According to an embodiment, the score function includes a local score component and a global score component. The local score considers the similarity of the mentions in the input text to candidates in the knowledge graph and analyzes the overall importance of a candidate vertex in the knowledge graph. The global score measures how related candidates in a tuple are to each other, which helps to address ambiguity by considering the context within the input text as a whole to predict the correct entity to which a mention should be linked. In an embodiment, the candidate selection process selects candidates from the knowledge graph to help maximize the score function (e.g., the local score component and/or the global score component), as a higher score function indicates that candidates are more similar to each other.

The present disclosure also provides an optimization technique that helps to efficiently obtain high-quality candidate predictions. According to an embodiment, the optimization technique includes a heuristic optimization process based on state space search exploration that is able to converge to a good solution in relatively few iterations. The optimization technique thereby helps to address the challenge that a complete evaluation of all possible candidates for entity linking may be computationally infeasible. Further, the optimization technique enables the disclosed entity linking technique to efficiently scale-up to analyze very large documents, which may include dozens of mentions to be linked, while exploiting the greater context that large documents offer and providing high-quality linked entities as a result.

Embodiments of the present disclosure also relate to a graph learning phase that generates a knowledge graph from a target knowledge base (e.g., DBpedia), and extracts information from the knowledge graph. The graph learning phase generally includes converting a knowledge base into a knowledge graph, in which entities in the knowledge base become vertices in the knowledge graph and relationships between entiles in the knowledge base become edges between vertices in the knowledge graph. The graph learning phase may also include analyzing the knowledge graph to compute metrics, such as an entropy of relations metric and a salience of vertices metric, and/or to extract vertex embeddings from the knowledge graph. The metrics and/or vertex embeddings may then be used to help identify candidates in the knowledge graph to potentially be linked to mentions from an input text, and to evaluate a score function to select and then link particular candidates to the mentions.

System Overview

FIG. 1 is a diagrammatic representation of an entity linking system according to an embodiment. In the illustrated embodiment, an entity linking system or NED engine 100 generates a knowledge graph from a knowledge base (e.g., DBpedia), extracts embeddings from the knowledge graph, and performs entity linking for mentions in an input text to entities in the knowledge graph. The present NED engine 100 includes one or more components that implement a graph learning phase 102 and one or more components that implement an execution phase 104. To implement the graph learning phase 102, FIG. 1 illustrates a graph building component 106 and an embeddings component 108. To implement the execution phase 104, FIG. 1 illustrates a named entity recognition (NER) component 110, a candidate finder component 112, and a disambiguation component 114.

To implement the graph learning phase 102, the graph building component 106 is configured to convert a knowledge base into a knowledge graph that can be processed by the NED engine 100. According to an example, the NED engine 100 is a computing system configured to execute graph analytics software, such as Parallel Graph AnalytiX (PGX), used to initialize a knowledge graph for vectorization. As referred to herein, PGX is a toolkit for graph analysis and is configured to run algorithms against graphs, such as random walks, Word2vec, PageRank, and vertex embedding analysis, and to perform SQL-like pattern-matching against graphs, using the results of algorithmic analysis. Algorithms may even be parallelized for greater performance. The PGX toolkit includes both a single-node in-memory engine, and a distributed engine for extremely large graphs. Graphs can be loaded from a variety of sources including flat files, SQL and NoSQL databases, Apache Spark, and Hadoop. PGX is commercially available through ORACLE CORPORATION. The techniques discussed herein, however, are applicable to any suitable graph analytic system that can process graphs and input text to perform such techniques.

The graph building component 106 is also configured to extract subgraphs from the knowledge graph, and to compute metrics to capture features of the knowledge graph. According to an embodiment, these subgraphs include a redirects graph and a relation graph, and the metrics include an entropy of relations metric and a salience of vertices metric, as will be described in more detail hereinafter.

To further implement the graph learning phase 102, the embeddings component 108 is configured to learn embeddings from the knowledge graph. More particularly, the embeddings component 108 is configured to generate a numerical feature value for each vertex in the knowledge graph. The numerical feature value represents a proximity or distance of the respective vertex to other vertices in the knowledge graph. Generating the numerical feature values or vertex embeddings includes executing a proximity algorithm, such as a Word2vec algorithm.

Techniques described herein represent graphs with vertex embeddings, which allows encoding in a low-dimensional space the complex topological relationships that exist among entities in the graph. Moreover, it is possible to encode in a unified way heterogeneous properties, such as textual labels, statistical measures, and other handcrafted features. The NED techniques disclosed herein help to exploit vertex embeddings to measure the degree of coherence, and thus also the quality of an entity linking candidate, which thereby results in high quality of the answers and improved classification accuracy of machine learning classification models. Further, reducing the dimensionality of the features helps to provide the benefits of requiring smaller input vectors, and/or matrixes to store and process, and thereby reduces storage and CPU processing needed for training machine learning models or executing machine learning models in applications of machine learning models. In addition, the machine learning models trained may have smaller model artifacts (see section MACHINE LEARNING MODELS), thereby further reducing storage and CPU processing needed for training machine learning models or executing machine learning models in applications of machine learning models.

To implement the execution phase 104, the NER component 110 is configured to receive input text and to extract, from the input text, mentions to be linked, e.g., names of persons, locations, companies, and the like. Generally, the NER component 110 identifies the occurrence or mention of a named entity in text but does not link the mention to a specific entity in the knowledge graph or knowledge base.

The candidate finder 104 is configured to reduce the dimensionality of the NED execution phase 104 by obtaining, for each mention found by the NER component 110, a smaller set of entities/candidates. These entities are represented by vertices of the knowledge graph, and the correct entity is presumably present among the candidates. To identify good candidates for an extracted mention, the candidate finder 104 may assign scores that represent similarity between a surface form of a mention and candidates linked to the mention in the knowledge graph. In this embodiment, the candidate finder 104 selects the set of candidate vertices with the highest similarity scores.

The disambiguation component 114 evaluates the set of candidates for each mention to provide final linked entities for mentions in a given input text. According to an embodiment, the disambiguation component 114 evaluates candidate tuples from sets of candidates for the extracted mentions to identify a resulting candidate tuple that includes candidates that are reasonably similar to the surface forms of the mentions, and also contains related concepts. This intuition stems from the observation that meaningful text usually contains related and coherent entities, often belonging to a specific topic.

Graph Learning Phase

FIG. 2 is a flowchart 200 depicting a graph learning phase according to an embodiment. The flowchart 200 provides additional details of the graph learning phase 102 of FIG. 1. At block 202, the graph building component 106 converts a knowledge base to a knowledge graph. According to an embodiment, the graph building component 106 starts from a knowledge base, such as Wikipedia or DBpedia, and encodes the topology of the knowledge base using a Resource Description Framework (RDF) format.

In the RDF format, data is stored as triples in the form <subject><relation><object>. The subject denotes the entity or resource, and the relation denotes traits or aspects of the entity and expresses a relationship between the subject and the object. An illustrative RDF triple is <Sacramento><CapitalOf<California>. To create the knowledge graph, the graph building component 106 converts the RDF data, such that <subject> and <object> entries become vertices, and <relation> information becomes is a directed edge between subject and object vertices. In PGX, for example, the knowledge graph is represented with an edgelist file containing information about vertices, edges, and other properties.

At block 204, the graph building component 106 extracts one or more subgraphs from the knowledge graph. In an example, the graph building component 106 loads the knowledge graph into a graph analysis component, such as PGX. In this example, the graph analysis component extracts a redirects graph and a relation graph from the knowledge graph. The redirects graph contains all the vertices (subjects and objects) of the knowledge graph, but only edges (relations) labelled as either "redirect" or "disambiguate." The redirects graph may be used by the candidate finder component 112 to help address ambiguity in the execution phase 104.

More particularly, a redirect is a page which automatically sends traffic to another page, such as another article or section of an article. For example, in Wikipedia, entering "UK" in the search box or clicking on a link "UK" will automatically direct traffic to the Wikipedia article for the "United Kingdom." This is because the page "UK" contains special Wikitext which defines it as a redirect page and indicates the target article. Disambiguation in the context of Wikipedia, for example, is the process of resolving conflicts that arise when a potential article title is ambiguous, most often because it refers to more than one subject covered by Wikipedia either as the main topic of an article, or as a subtopic covered by an article in addition to the article's main topic. For example, the word "Mercury" can refer to a chemical element, a planet, or a Roman god. The redirects graph captures these redirect and disambiguation relationships between vertices.

The relation graph contains all other edges (relations) that are not labelled as redirect or disambiguate, and only the vertices that connect such other edges. Relations besides redirect or disambiguate include, for example, BornIn, FatherOf, CapitalOf, and many others. Identifying these other relations helps to further capture the topology of the knowledge graph and to preserve specific ordering of the RDF triplets, which can further enhance extracted embeddings.

At block 206, the graph building component 106 computes one or more metrics based on the knowledge graph. According to an example, the graph building component 106 computes an entropy of relations metric and a salience of vertices metric. The graph building component 106 calculates entropy for each relation type to capture the randomness of the distribution for the set of objects/entities. Intuitively, following edges with higher entropy will convey greater information gain as a measure of how much information a relation type provides.

In the present example, the graph building component 106 further computes salience for each vertex by using entropy as an edge weight to obtain a weighted PageRank score for the vertex. This salience metric captures the overall importance of a certain entity, and its prior probability of appearing in a text. Technical details and examples of such entropy and salience computations are taught, for instance, in "Entity Linking for Biomedical Literature" by Zheng et al., published in BMC Medical Informatics and Decision Making 2015, 15.1:S4.

At block 208, the embeddings component 108 learns embeddings or representations from the knowledge graph. A type of representation learning utilized herein is vertex-level representation or embedding learning. Such learning represents close nodes as similar vectors in the representation vector space, and where closeness could be structural closeness or property-oriented closeness. This learning objective benefits vertex-level tasks such as vertex classification or vertex clustering. Leaning vertex embeddings in this embodiment generally involves computing numeric representations of and relationships between knowledge graph vertices, such that the numerical representations reveal semantic and syntactic similarities and relationships of entities in the knowledge graph.

In the flowchart 200, the embeddings component 108 learns embeddings by performing processes according to a DeepWalk technique represented by blocks 210 and 212. The DeepWalk technique learns latent representations in a low-dimensional vector space by exploiting local node neighborhoods. In the present embodiment, at block 210, the embeddings component 108 computes random walk paths from each vertex, and at block 212, the embeddings component 108 learns vertex representations from the random walk paths.

At block 210, the embeddings component 108 employs PGX, for example, to compute random walks where the walks are controlled using two parameters, namely, number of walks per vertex and a maximum length of a random walk. PGX may compute the random walks in a parallelized manner, meaning that random walks are implement in parallel for a plurality of vertices. To generate a random walk path, the embeddings component 108 starts at one node or vertex and chooses a neighbor node to navigate to at random or based on a provided probability distribution, and then proceeds to do the same from that neighbor node while keeping the resulting path in a list. For a given knowledge graph, the iterative process of computing random walks may start from a given vertex, and at each step, either follows a random outgoing edge of the current vertex or jumps to a random vertex if no outgoing edge is available. Since some vertices may not have any outgoing edges, a random walk would otherwise terminate at those places without jumping to a random vertex.

At block 212, the embeddings component 108 learns vector embeddings or representations from the computed random walk paths. According to an embodiment, the embeddings component 108 employs PGX, for example, to convert each word or entity in the random walk paths into a vector of numeric values. Any suitable technique for converting an entity into a vector may be used. According to an embodiment, the embeddings component 108 generates word vector embeddings using Word2vec, which is a group of related models that are used to produce word vector embeddings. The Word2vec models are two-layer neural networks that are trained to reconstruct linguistic contexts of words. Word2vec takes as its input a corpus of text (e.g., the random walk paths) and produces a vector space, typically of several hundred dimensions, with each unique word in the corpus being assigned a corresponding vector in the space. Word vectors are positioned in the vector space such that words that share common contexts in the corpus are located in close proximity to one another in the space.

Word2vec may utilize models to produce a distributed representation of words, such as a continuous bag-of-words (CBOW) model or a skip-gram model. The objective of the CBOW model is to predict a current word from a window of surrounding context words. The order of context words does not influence prediction. The objective of the skip-gram model is to use a current word and to find word representations that help to predict the surrounding window of context words. The skip-gram model weighs nearby context words more heavily than more distant context words. Generally, the CROW model is relatively faster than the skip-gram model, while the skip-gram model generally provides a better representation for infrequent or rare words.

Execution Phase

FIG. 3 is a flowchart 300 depicting an execution phase of an entity linking technique according to an embodiment. The flowchart 300 provides additional details of the execution phase 104 of FIG. 1. At block 302, the NER component 110 receives input text or document for entity linking analysis. The NER component 110 may receive the input text via a wireless communication network from a client device, for example. At block 304, the NER component 110 extracts mentions from the received input text. According to an embodiment, the NER component 110 uses a name tagger to extract entity mentions. In this embodiment, to join named entities that might have been considered separate, the NER component uses regular expressions and looks for intervening prepositions, articles, and punctuation marks. The NER component 110 may further use a shallow parser to add noun phrase chunks to the list of mentions, and use a parameter to control the minimum and maximum number of chunks per mention (e.g., by default, one and five, respectively), and whether overlapping mentions are allowed. Other suitable NER techniques may be employed in other embodiments.

At block 306, the candidate finder component 112 identifies a set of one or more candidate entities for each extracted mention. The entities in the set of one or more candidate entities are represented by vertices of the knowledge graph. According to an embodiment, at block 306, the candidate finder component 112 extracts candidate entities from the knowledge graph by using string matching applications provided by SOLR, Lucene, or other similar systems. More particularly, the candidate finder component 112 performs string matching for each candidate entity to assign a similarity score that represents similarity between the entity and a surface form of the mention. In an example, the similarity score is a value between 0.0 and 1.0, and a score closer to 1.0 indicates greater similarity. The candidate finder component 112, for each mention, selects for the set of candidate entities a number entities with the highest similarity score.

Some candidate entities may appear with many different surface forms, which may be very different from one another. For example, an entity for "New York City" might appear also as "NY," "NYC," "Big Apple," "The City," among others. To help address this issue, according to an embodiment, the candidate finder component 112 traverses through the redirects subgraph, which was built during the graph learning phase 102. An example of a redirect in the context of Wikipedia would be a page for wikipedia.org/wiki/NYC redirecting to a page for wikipedia.org/wiki/New_York_City, and this redirection relationship may embedded in a redirect page at wikipedia.org/w/index.php?title=NYC&redirect=no.

By building redirects graphs with DBpedia redirect links, such as redirects graph 400 of FIG. 4A, the candidate finder component 112 may match a surface form of a mention, such as an "NY" surface form 402 to a vertex 404 corresponding to the entity "NY" in the redirects graph, and then follow a redirect link or edge 406 from the vertex "NY" to a vertex 408 corresponding to the entity "New_York." As an end vertex or node, the candidate finder component 112 may identify the vertex 408 for "New_York" as a candidate entity for the mention "NY," and accordingly generate a score for the entity "New_York" as a candidate for the mention "NY." In this case, the score given to candidate vertex "New_York" would involve a score propagation and be in the form: Score("New_York")=max(similarity("NY", "NY"), similarity("NY", "New_York"). FIG. 4A illustrates a similar redirects graph traversal for a surface form 410 "NY City" to a vertex 412 for "NYC," along a redirect link 414 to a vertex 416 for "New_York_City," and along another redirect link 418 to the vertex 408 for "New_York."

Another ambiguous scenario may arise with generic surface forms that could be mapped to different vertices in a knowledge graph. For example, a surface form for "Paris" may be linked to the French city or to one or more American cities. By building redirect graphs with disambiguation links and redirect links, such as a redirect graph 450 of FIG. 4B, the candidate finder component 112 may match a surface form for "Paris" to a disambiguation page or vertex 452 for "Paris." In the present example, the candidate finder component 112 follows disambiguation link 454 to a destination vertex 456 for "Paris, France," and from vertex 456 follows redirect link 458 to vertex 460 for "Paris," which is identified as a candidate entity for the mention "Paris." In this example, however, the candidate finder component 112 also follows disambiguation link 462 to destination vertex 464 for "Paris, Texas," which is also identified as a candidate entity for the mention "Paris."

According to this embodiment, if a surface form is matched with a disambiguation page, the candidate finder component 112 adds all the destination vertices from the disambiguation page to the list of candidate entities, and uses the score propagation formula discussed above to generate a score for the candidate entities. When disambiguation links are added to redirect graphs, redirect links and disambiguation links might follow each other. In such cases, the candidate finder component 112 may perform a breadth-first search (BFS) of the graph starting from each matched candidate vertex in order to follow multiple steps or links throughout the redirects graph. Generally, in BFS, the candidate finder component 112 traverses through neighbor vertices at a next depth prior to moving to further downstream vertices.

At this stage following block 306, each mention has a set of candidate vertices, and each candidate has its own computed similarity score. At block 308, the disambiguation component 114 evaluates the set of candidate vertices for each extracted mention to select the best candidate vertex for each mention and provide final linked entities for the given input document. Illustratively, given a list of extracted mentions (M_0, M_1, . . . , M_N), each mention M_i has a list of candidate vertices or entities (C_i1, C_i2, . . . , C_iK_i). In practice, the number of candidates may be different for different mentions. A candidate solution for a given input text is formed as a tuple (C_1p, C_2q, . . . , C_Nt), with C_1p, C_2q, . . . , C_Nt are candidate vertices selected from the candidate sets corresponding to each mention.

At block 308, the disambiguation component 114 evaluates candidate vertices by computing and optimizing a score function. According to an embodiment, the disambiguation component 114 computes a local score at block 310 and computes a global score at block 312. At block 314, the disambiguation component 114 optimizes a score function comprising the local score and/or the global score. According to an embodiment, the disambiguation component 114 evaluates the score function to identify a candidate tuple, among all the possible tuples T, that maximizes the local and global scores. The local and global scores could be given different weights, and identifying the "best" candidate tuple can be represented by the formulation:

BEST_TUPLE=argmax_{T}(\sum_{ti\in T}LOCAL(ti)+GLOBAL(T))

Referring more particularly to block 310, the local score considers the similarity of the mentions to their candidate entities or vertices, and also the overall importance of a candidate vertex in the knowledge graph. Generally, if two candidates are equally similar to a mention, the most important candidate may be chosen. According to an embodiment, the disambiguation component 114 computes the local score of a tuple as a sum of independent local scores of each candidate vertex. In this embodiment, the local score of a candidate is a sum of its candidate similarity score (for example, computed at block 306 of FIG. 3) and its salience (for example, computed at block 206 of FIG. 2).

At block 312, the disambiguation component 114 computes the global score, which measures how related candidates in a tuple are to each other. According to an embodiment, the disambiguation component 114 computes the global score by using a Personalized PageRank (PPR) approach, which involves computing PPR rankings or scores for each candidate vertex and summing pair-wise scores. Generally, PPR quantifies the importance of each vertex in a graph with respect to a designated personalization vertex. Given a personalization vertex, vertices with higher PPR scores will be more relevant to the personalization vertex. At block 312, the disambiguation component 114 uses this idea to compute the relatedness of a tuple of candidate vertices. For each candidate vertex, the disambiguation component 114 computes PPR scores using that vertex as the personalization vertex, and stores the PPR scores of all the other candidate vertices. The disambiguation component 114 is configured to identify the tuple of candidate vertices with the highest sum of pairwise PPR scores. Additional details of PageRank and Personalized PageRank are discussed in more detail below.

According to another embodiment, at block 312, the disambiguation component 114 uses a vertex embeddings technique to compute the global score. Generally, the vertex embedding technique measures how related candidates in a tuple are to each other by computing similarity between vertex embeddings for the candidates. To compute similarity between candidate vertex embeddings, the disambiguation component 114 computes a distance between vertex embeddings using cosine similarity, or equivalently, dot product of normalized vectors. One formula for cosine similarity is:

$$A \cdot B = |A||B|\cos(\theta) \rightarrow$$
$$\frac{A \cdot B}{|A||B|} = \cos(\theta)$$

To compute the global score of a tuple, the disambiguation component 114 may take a sum of pairwise similarities of all the candidate vertex embeddings and/or take a sum of the similarities of the candidate vertex embeddings from a mean vector of the tuple's vertex embeddings.

Figures 5A, 5B:
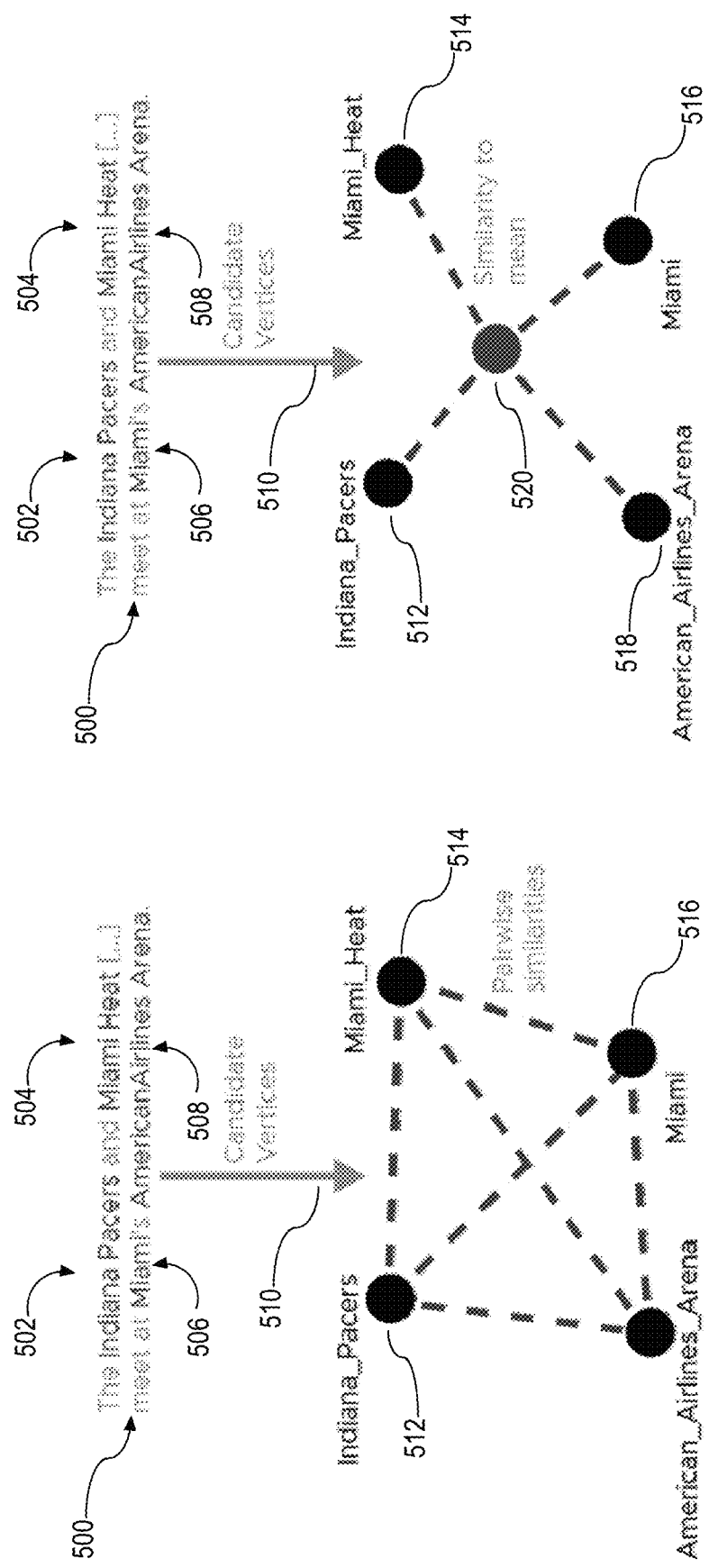
FIG. 5A illustrates an example of using pairwise similarities of candidate vertex embeddings to compute a global score.
FIG. 5B illustrates an example of using a mean vector of candidate vertex embeddings to compute a global score.

FIG. 5A illustrates an example of using pairwise similarities of candidate vertex embeddings to compute a global score. In FIG. 5A, a portion of input text 500 includes "The Indiana Pacers and Miami Heat [ . . . ] meet at Miami's American Airlines Arena. From this input text, the following mentions are extracted—Indiana_Pacers 502, Miami_Heat 504, Miami 506, and American_Airlines_Arena 508. Each of these mentions is associated with a set of one or more candidate entities. At block 312, the disambiguation component 114 evaluates the sets of candidate entities by computing global score functions for candidate tuples, which each include a different combination of candidates for each mention. FIG. 5A depicts a representation of a candidate tuple 510 that includes a candidate vertex 512 for the mention Indiana_Pacers, a candidate vertex 514 for the mention Miami_Heat, a candidate vertex 516 for the mention Miami, and a candidate vertex 518 for the mention American_Airlines_Arena. To compute the global score of the candidate tuple 510, the disambiguation component 114 takes a sum of pairwise similarities (represented by dashed lines) of all the candidate vertex embeddings.

FIG. 5B illustrates an example of using a mean vector of candidate vertex embeddings to compute a global score. In this example, the disambiguation component 114 computes a mean vector 520 of the candidate tuple embeddings, and computes the global score by taking a sum of similarities (represented by dashed lines) of each candidate vertex to the mean vector.

According to an embodiment, the disambiguation component 114 may compute the global score as a linear combination of the pairwise similarities approach and the mean vector approach. Although, using just the mean vector approach can yield a faster execution time that may be more suitable for documents containing a relatively large number of mentions (e.g., ten or more mentions). Further, the vertex embedding technique may be performed in conjunction with the PPR approach discussed above, or as an alternative that provides an approximation of the PPR scores while maintaining good results and efficient scalability to process documents containing a relatively large number of mentions.

At block 314, the disambiguation component 114 optimizes the score function to identify candidate tuples with scores that indicate greater similarity between each candidate and its associated mention, and between candidates in a candidate tuple for multiple mentions. The disambiguation component 114 may then select the best candidate tuple, which provides a final mapping of corresponding linked entities to extracted mentions from the input document.

Optimization

Figure 6:
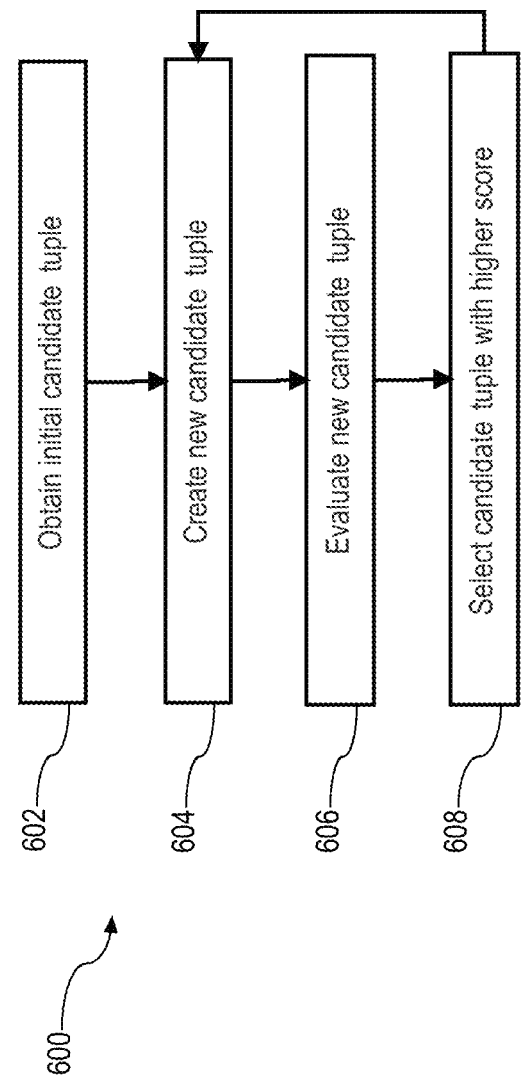
FIG. 6 is a flowchart depicting an optimization process of an entity linking technique according to an embodiment.

FIG. 6 is a flowchart 600 depicting an optimization aspect of an entity linking technique according to an embodiment. As discussed above, evaluating all possible candidates for entity linking may be too computationally burdensome, for instance, a document with ten mentions with ten candidates each would result in 10^10 different tuples). To help overcome this issue, FIG. 6 provides a heuristic optimization technique based on state space search exploration. The general approach of the optimization technique is to iteratively improve an existing candidate tuple. Starting from an initial tuple, which may be created at random, at each iteration a new tuple is created which should have an improved quality score. The optimization technique may cease or terminate after a given number of iterations, or when a termination criterion is met, for example, when the quality score has not improved over a predetermined number of iterations.

At block 602, the disambiguation component 114 obtains an initial candidate tuple. To quickly obtain a good initial candidate tuple, the disambiguation component 114 may select, for each mention, the candidate with a highest local score, which may be computed as a sum of salience and mention-candidate similarity scores, for example, computed at block 206 of FIG. 2. In this example, the starting candidate tuple is the one with maximum local score, which may be maximized in linear time with respect to the number of candidates, and tuples with high local score are often close to the overall maximum. At block 602, the disambiguation component 114 may also evaluate the initial candidate tuple by calculating the global score of the initial candidate tuple.

At block 604, the disambiguation component 114 starts from the initial tuple and creates a specified number of new tuples by modifying a random number of candidates. At block 606, the disambiguation component 114, for each mention (in random order), evaluates tuples by picking the candidate that maximizes the overall score of the tuple, while the other candidates are kept (temporarily) fixed. At block 608, the disambiguation component picks the best of these new tuples based on improvements in the overall score of the tuple.

Method Overview

Flowcharts 200 of FIG. 2, 300 of FIG. 3, and 600 of FIG. 6 include operations, functions, and/or actions as represented by the illustrated blocks. For purposes of illustrating a clear example, the flowcharts are described with reference to execution using certain elements disclosed herein, such as elements disclosed by FIG. 1, FIG. 7, and FIG. 8. However, the methods may be implemented in other embodiments using different computing devices, programs, or other computing elements. Further, although the blocks are illustrated in a particular order, the blocks may also be performed in parallel, and/or in a different order than described herein. Flowcharts 200, 300, and 600 may also include additional or fewer blocks, as needed or desired. For example, the blocks can be combined into fewer blocks, divided into additional blocks, and/or removed based upon a desired implementation.

FIG. 2, FIG. 3, and FIG. 6 may be implemented using one or more computer programs or other software elements organized as sequences of instructions stored on computer-readable storage media. Each flow diagram or other process description in this disclosure, is described at the same level of detail as ordinarily used by persons of skill in the computing arts to communicate among one another about the functional steps to be realized in computer programs that may include far more methods, objects, subroutines, or instructions than specifically indicated in FIG. 2, FIG. 3, and FIG. 6. The development, deployment, testing, and debugging of functional programs is deemed to be within the high level of skill in the art to which this disclosure pertains.

In addition, each block may represent a module, a segment, or a portion of program code that includes one or more instructions executable by a processor for implementing specific logical functions or operations. The program code may be stored on any type of computer-readable medium or storage device including a disk or hard drive, for example. The computer-readable medium may include a non-transitory computer-readable medium, such as computer-readable media that stores data for short periods of time like register memory, processor cache, and Random Access Memory (RAM). The computer-readable medium may also include non-transitory media, such as secondary or persistent long-term storage, like read only memory (ROM), optical or magnetic disks, compact-disc read only memory (CD-ROM), etc. The computer-readable medium may also include any other volatile or non-volatile storage systems. The computer-readable medium may be considered a computer-readable storage medium, for example, or a tangible storage device. In addition, one or more of the blocks may represent circuitry that is configured to perform the logical functions and operations of the methods.

Software and Hardware Overview

Figure 7:
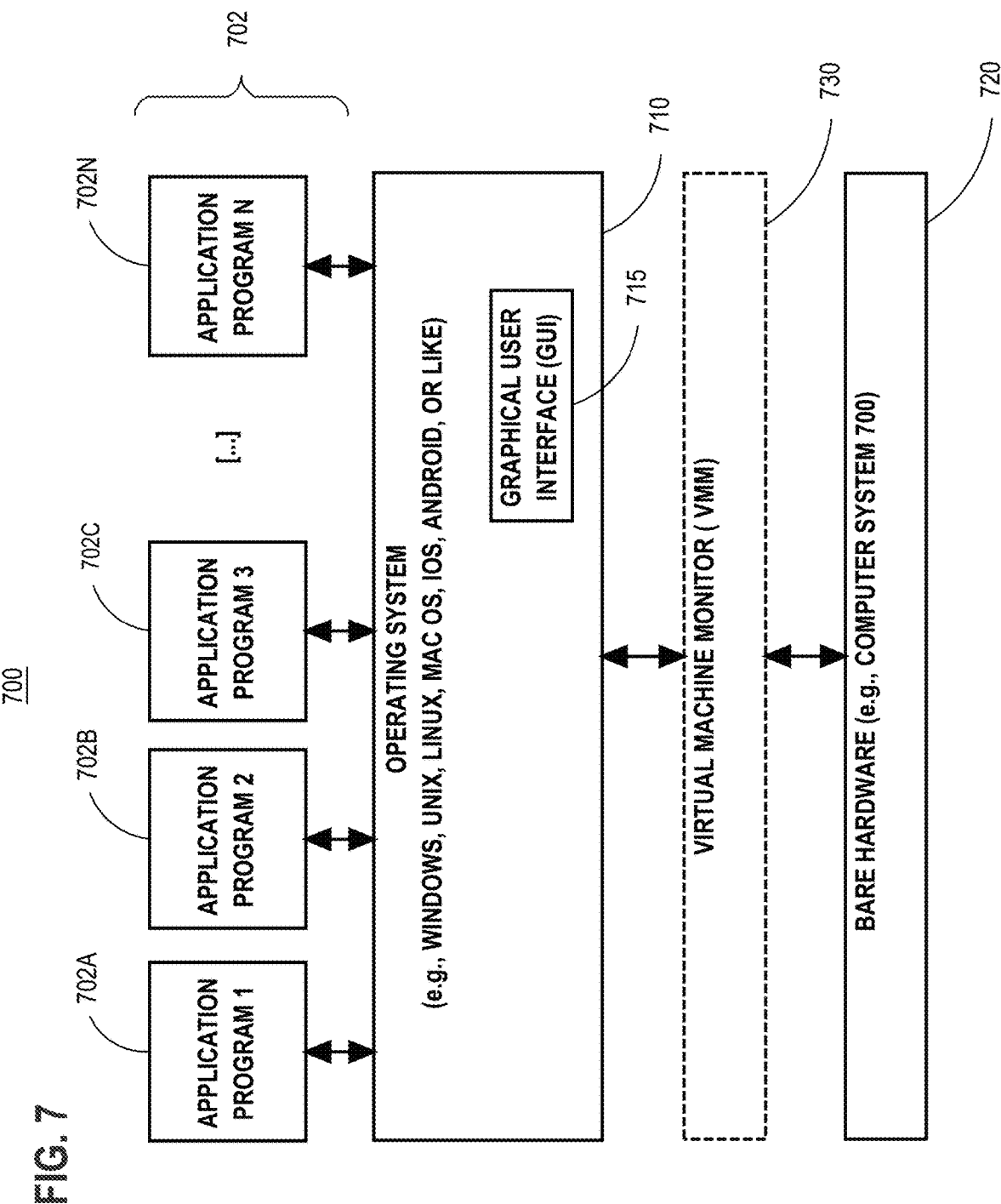
FIG. 7 is a diagram depicting a software system that can be used to implement one or more features of embodiments disclosed herein.
Figure 8:
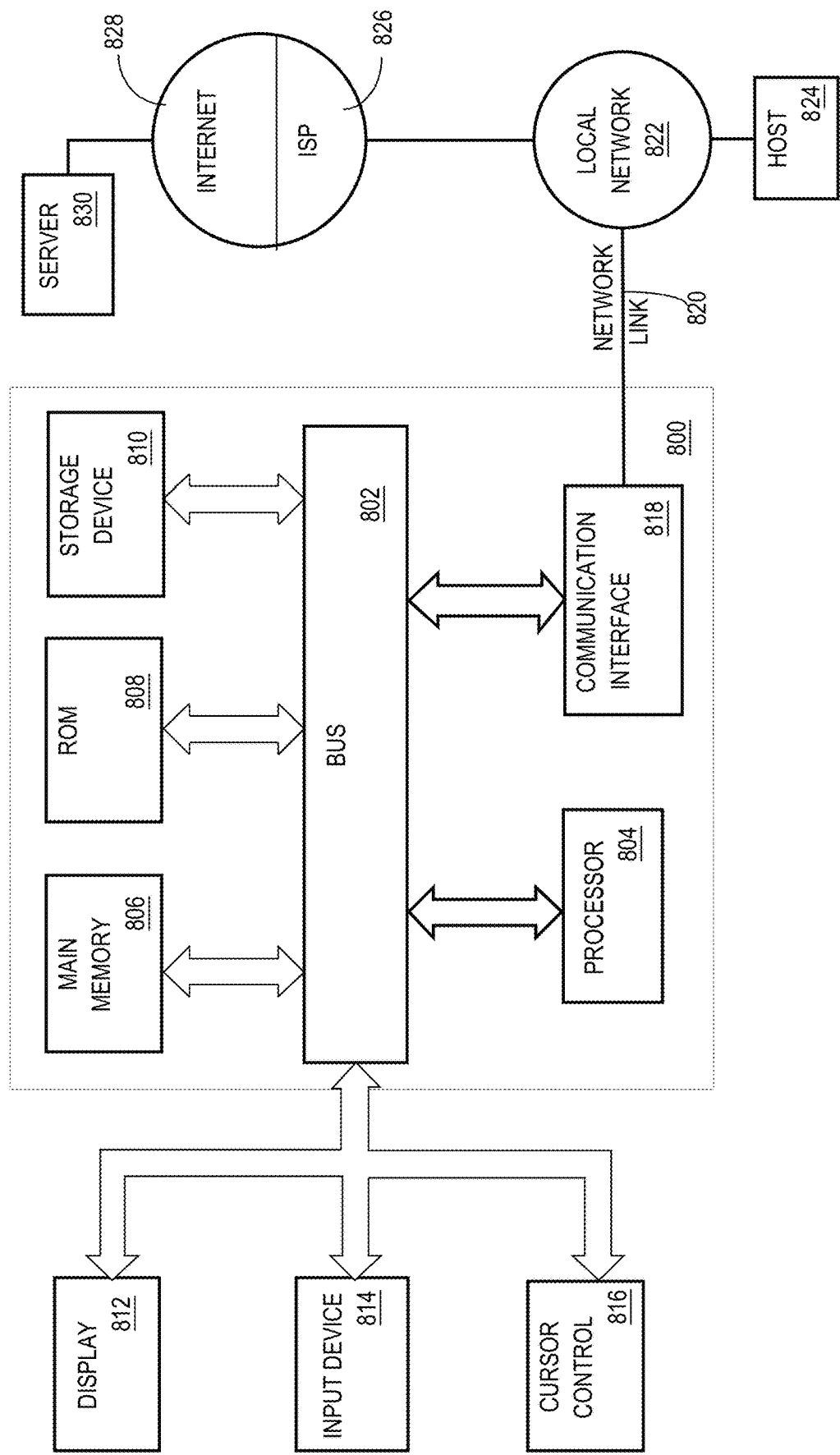
FIG. 8 is a diagram depicting a computer system that can be used to implement one or more features of embodiments disclosed herein.

FIG. 7 is a block diagram of a basic software system 700 that may be employed for controlling the operation of computing system 800 of FIG. 8. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 800. Software system 700, which may be stored in system memory (RAM) 806 and on fixed storage (e.g., hard disk or flash memory) 810, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 810 into memory 806) for execution by the system 800. The applications or other software intended for use on computer system 800 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 800 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 804) of computer system 800. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 800.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 800 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to an embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein Machine Learning Models A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programming languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake a I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero).

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e. complexity) of a momentary input may be less than the information content of the surrounding context. Thus, semantics may occur based on context, such as a temporal sequence across inputs or an extended pattern (e.g. compound geometry) within an input example. Various techniques have emerged that make deep learning be contextual. One general strategy is contextual encoding, which packs a stimulus input and its context (i.e. surrounding/related details) into a same (e.g. densely) encoded unit that may be applied to an ANN for analysis. One form of contextual encoding is graph embedding, which constructs and prunes (i.e. limits the extent of) a logical graph of (e.g. temporally or semantically) related events or records. The graph embedding may be used as a contextual encoding and input stimulus to an ANN.

Hidden state (i.e. memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection. For example, an RNN based spelling model may predict that a U follows a Q while reading a word letter by letter. If a letter actually following the Q is not a U as expected, then an anomaly is detected.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e. reset) gate. Unlike a binary circuit, the input and output gates may conduct an (e.g. unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e. gross topology). Each step receives two inputs and outputs two outputs. One input is external activation from an item in an input sequence. The other input is an output of the adjacent previous step that may embed details from some or all previous steps, which achieves sequential history (i.e. temporal context). The other output is a predicted next item in the sequence.

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation.

Pagerank Overview

In general, PageRank (PR) is an algorithm that measures the transitive influence or connectivity of nodes. PR measures stationary distribution of one specific kind of random walk that starts from a random vertex and in each iteration, with a predefined probability (p), jumps to a random vertex, and with probability (1-p), follows a random outgoing edge of the current vertex. PageRank is usually conducted on a graph with homogeneous edges, for example, a graph with edges in the form of "A linksTo B," "A references B," or "A likes B," or "A endorses B," or "A readsBlogsWrittenBy B," or "A hasImpactOn B." Running a PageRank algorithm on a graph generates rankings for vertices and the numeric PR values can be viewed as "importance" or "relevance" of vertices. A vertex with a high PR value is usually considered more "important" or more "influential" or having higher "relevance" than a vertex with a low PR value.

Personalized Pagerank Overview

Personalized PageRank (PPR) is similar to PageRank (PR) except that jumps are back to one of a given set of root vertices for which the PR is personalized for. The random walk in PPR is biased towards, or personalized for, the selected set of root vertices and is more localized compared to the random walk performed in PR.

Executing a PPR algorithm produces a measurement of proximity (distance metric), that is, how similar (relevant) a root vertex is to other vertices in a graph. In context of candidate vertices of a graph, PPR can be used to encode similarity between vertices into numerical features that specify the proximity of a vertex in a graph from potential candidate vertices in the graph. Any available algorithms can be used to calculate a PPR for a vertex in a graph. For example, technical details and examples of PPR calculating algorithms are disclosed in "FAST-PPR: Scaling Personalized PageRank Estimation for Large Graphs" by Peter Lofgren, Siddhartha Banerjee, Ashish Goel, C. Seshadhri, August 2014.

What is claimed is:

1. A method comprising:
   receiving input text;
   extracting a first mention and a second mention from the input text;
   selecting, from a knowledge graph, a plurality of first candidate vertices for the first mention and a plurality of second candidate vertices for the second mention;
   evaluating a score function for the plurality of first candidate vertices and the plurality of second candidate vertices, wherein the score function analyzes vertex embedding similarity between the plurality of first candidate vertices and the plurality of second candidate vertices, wherein vertex embeddings for the plurality of first candidate vertices and the plurality of second candidate vertices are derived from the knowledge graph;

in response to evaluating the score function, selecting a first selected candidate vertex from the plurality of first candidate vertices and a second selected candidate vertex from the plurality of second candidate vertices, wherein the selecting of the first selected candidate vertex and the second selected candidate vertex seeks to optimize the score function; and mapping a first entry from the knowledge graph to the first mention and mapping a second entry from the knowledge graph to the second mention, wherein the first entry corresponds to the first selected candidate vertex and the second entry corresponds to the second selected candidate.

2. The method of claim 1, wherein evaluating the score function further comprises:
  calculating a mean vector based on vertex embeddings of a set of candidate vertices, wherein the set of candidate vertices includes at least one candidate vertex from the plurality of first candidate vertices and at least one candidate vertex from the plurality of second candidate vertices; and
  analyzing a sum of vertex embedding similarities of the set of candidate vertices from the mean vector.

3. The method of claim 1, wherein evaluating the score function further comprises:
  calculating pairwise vertex embedding similarities between the plurality of first candidate vertices and the plurality of second candidate vertices; and
  analyzing a sum of the pairwise vertex embedding similarities between the plurality of first candidate vertices and the plurality of second candidate vertices.

4. The method of claim 1, wherein evaluating the score function further comprises:
  calculating a mean vector based on vertex embeddings of a set of candidate vertices, wherein the set of candidate vertices includes at least one candidate vertex from the plurality of first candidate vertices and at least one candidate vertex from the plurality of second candidate vertices;
  calculating pairwise vertex embedding similarities between candidate vertices in the set of candidate vertices; and
  analyzing a sum of vertex embedding similarities of the set of candidate vertices from the mean vector, and a sum of the pairwise vertex embedding similarities between candidate vertices in the set of candidate vertices.

5. The method of claim 1, wherein evaluating the score function further comprises using cosine similarity to analyze vertex embedding similarity between the plurality of first candidate vertices and the plurality of second candidate vertices.

6. The method of claim 1, wherein evaluating the score function further comprises computing Personalized PageRank scores for the plurality of first candidate vertices and the plurality of second candidate vertices.

7. The method of claim 1, wherein evaluating the score function further comprises calculating local scores for the plurality of first candidate vertices and the plurality of second candidate vertices, wherein a local score of a particular candidate vertex includes a first value, obtained by a string matching technique, that represents similarity between the particular candidate vertex and a corresponding mention, and a second value, obtained by a weighted PageRank technique, that represents salience of the particular candidate vertex.

8. The method of claim 1, wherein evaluating the score function comprises:
  calculating local scores for the plurality of first candidate vertices and the plurality of second candidate vertices, wherein a local score of a particular candidate vertex includes a first value that represents similarity between the particular candidate vertex and a corresponding mention, and a second value that represents salience of the particular candidate vertex; and
  calculating global scores for a plurality of sets of candidate vertices, wherein each set of candidate vertices includes at least one candidate vertex from the plurality of first candidate vertices and at least one candidate vertex from the plurality of second candidate vertices, wherein a global score for a particular set of candidate vertices represents how related candidate vertices within the particular set of candidate vertices are to each other.

9. The method of claim 1, wherein a named entity disambiguation (NED) engine performs the evaluating the score function for the plurality of first candidate vertices and the plurality of second candidate vertices, wherein the NED engine is trained by:
  extracting random walk paths from the knowledge graph; and
  producing vertex embeddings from the extracted random walk paths;
  wherein the NED engine uses the produced vertex embeddings in the evaluating the score function.

10. The method of claim 9, wherein the NED engine is trained by:
  computing an entropy metric for relationships between entities in the knowledge graph; and
  computing, for vertices in the knowledge graph, a salience metric using entropy as edge weight;
  wherein the NED engine performs the evaluating the score function by calculating local scores for the plurality of first candidate vertices and the plurality of second candidate vertices, wherein a local score of a particular candidate vertex includes a first value, obtained by a string matching technique, that represents similarity between the particular candidate vertex and a corresponding mention, and a second value based on the computed salience metric.

11. One or more non-transitory computer-readable storage medium storing instructions that, when executed by one or more processors, cause the one or more processors to perform functions comprising:
  receiving input text;
  extracting a first mention and a second mention from the input text;
  selecting, from a knowledge graph, a plurality of first candidate vertices for the first mention and a plurality of second candidate vertices for the second mention;
  evaluating a score function for the plurality of first candidate vertices and the plurality of second candidate vertices, wherein the score function analyzes vertex embedding similarity between the plurality of first candidate vertices and the plurality of second candidate vertices, wherein vertex embeddings for the plurality of first candidate vertices and the plurality of second candidate vertices are derived from the knowledge graph;

in response to evaluating the score function, selecting a first selected candidate vertex from the plurality of first candidate vertices and a second selected candidate vertex from the plurality of second candidate vertices, wherein the selecting of the first selected candidate vertex and the second selected candidate vertex seeks to optimize the score function; and mapping a first entry from the knowledge graph to the first mention and mapping a second entry from the knowledge graph to the second mention, wherein the first entry corresponds to the first selected candidate vertex and the second entry corresponds to the second selected candidate.

12. The one or more non-transitory computer-readable storage medium of claim 11, further comprising instructions that, when executed by one or more processors, cause the one or more processors to perform the function of evaluating the score function by further performing functions comprising:

calculating a mean vector based on vertex embeddings of a set of candidate vertices, wherein the set of candidate vertices includes at least one candidate vertex from the plurality of first candidate vertices and at least one candidate vertex from the plurality of second candidate vertices; and analyzing a sum of vertex embedding similarities of the set of candidate vertices from the mean vector.

13. The one or more non-transitory computer-readable storage medium of claim 11, further comprising instructions that, when executed by one or more processors, cause the one or more processors to perform the function of evaluating the score function by further performing functions comprising:

calculating pairwise vertex embedding similarities between the plurality of first candidate vertices and the plurality of second candidate vertices; and analyzing a sum of the pairwise vertex embedding similarities between the plurality of first candidate vertices and the plurality of second candidate vertices.

14. The one or more non-transitory computer-readable storage medium of claim 11, further comprising instructions that, when executed by one or more processors, cause the one or more processors to perform the function of evaluating the score function by further performing functions comprising:

calculating a mean vector based on vertex embeddings of a set of candidate vertices, wherein the set of candidate vertices includes at least one candidate vertex from the plurality of first candidate vertices and at least one candidate vertex from the plurality of second candidate vertices;

calculating pairwise vertex embedding similarities between candidate vertices in the set of candidate vertices; and analyzing a sum of vertex embedding similarities of the set of candidate vertices from the mean vector, and a sum of the pairwise vertex embedding similarities between candidate vertices in the set of candidate vertices.

15. The one or more non-transitory computer-readable storage medium of claim 11, further comprising instructions that, when executed by one or more processors, cause the one or more processors to perform the function of evaluating the score function by further performing functions comprising using cosine similarity to analyze vertex embedding similarity between the plurality of first candidate vertices and the plurality of second candidate vertices.

16. The one or more non-transitory computer-readable storage medium of claim 11, further comprising instructions that, when executed by one or more processors, cause the one or more processors to perform the function of evaluating the score function by further performing functions comprising computing Personalized PageRank scores for the plurality of first candidate vertices and the plurality of second candidate vertices.

17. The one or more non-transitory computer-readable storage medium of claim 11, further comprising instructions that, when executed by one or more processors, cause the one or more processors to perform the function of evaluating the score function by further performing functions comprising calculating local scores for the plurality of first candidate vertices and the plurality of second candidate vertices, wherein a local score of a particular candidate vertex includes a first value, obtained by a string matching technique, that represents similarity between the particular candidate vertex and a corresponding mention, and a second value, obtained by a weighted PageRank technique, that represents salience of the particular candidate vertex.

18. The one or more non-transitory computer-readable storage medium of claim 11, further comprising instructions that, when executed by one or more processors, cause the one or more processors to perform the function of evaluating the score function by further performing functions comprising:

calculating local scores for the plurality of first candidate vertices and the plurality of second candidate vertices, wherein a local score of a particular candidate vertex includes a first value that represents similarity between the particular candidate vertex and a corresponding mention, and a second value that represents salience of the particular candidate vertex; and calculating global scores for a plurality of sets of candidate vertices, wherein each set of candidate vertices includes at least one candidate vertex from the plurality of first candidate vertices and at least one candidate vertex from the plurality of second candidate vertices, wherein a global score for a particular set of candidate vertices represents how related candidate vertices within the particular set of candidate vertices are to each other.

19. The one or more non-transitory computer-readable storage medium of claim 11, further comprising instructions that, when executed by one or more processors, cause the one or more processors to perform the function of causing a named entity disambiguation (NED) engine to perform the function of evaluating the score function for the plurality of first candidate vertices and the plurality of second candidate vertices, wherein the NED engine is trained by:

extracting random walk paths from the knowledge graph; and producing vertex embeddings from the extracted random walk paths;

wherein the NED engine uses the produced vertex embeddings in performing the function of evaluating the score function.

20. The one or more non-transitory computer-readable storage medium of claim 19, wherein the NED engine is further trained by:

computing an entropy metric for relationships between entities in the knowledge graph; and computing, for vertices in the knowledge graph, a salience metric using entropy as edge weight;

wherein the NED engine performs the function of evaluating the score function by calculating local scores for the plurality of first candidate vertices and the plurality of second candidate vertices, wherein a local score of a particular candidate vertex includes a first value, obtained by a string matching technique, that represents similarity between the particular candidate vertex and a corresponding mention, and a second value based on the computed salience metric.

* * * * *